United States Patent
Yamany

(10) Patent No.: US 10,659,334 B2
(45) Date of Patent: *May 19, 2020

(54) METHODS, SYSTEMS, AND COMPUTER PROGRAM PRODUCTS FOR DISTRIBUTED PACKET TRAFFIC PERFORMANCE ANALYSIS IN A COMMUNICATION NETWORK

(71) Applicant: VIAVI Solutions Inc., Milpitas, CA (US)

(72) Inventor: Sameh Yamany, Longmont, CO (US)

(73) Assignee: VIAVI Solutions Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/055,794

(22) Filed: Aug. 6, 2018

(65) Prior Publication Data

US 2018/0351841 A1 Dec. 6, 2018

Related U.S. Application Data

(63) Continuation of application No. 15/420,259, filed on Jan. 31, 2017, now Pat. No. 10,044,586, which is a
(Continued)

(51) Int. Cl.
*H04L 12/26* (2006.01)
*H04L 12/24* (2006.01)

(52) U.S. Cl.
CPC ........ *H04L 43/0876* (2013.01); *H04L 41/046* (2013.01); *H04L 41/14* (2013.01); *H04L 41/5035* (2013.01); *H04L 43/12* (2013.01); *H04L 41/509* (2013.01); *H04L 41/5087* (2013.01); *H04L 43/087* (2013.01);
(Continued)

(58) Field of Classification Search
None
See application file for complete search history.

(56) References Cited

U.S. PATENT DOCUMENTS 9,565,073 B2 2/2017 Yamany
10,044,586 B2 8/2018 Yamany
(Continued)

FOREIGN PATENT DOCUMENTS

EP 2 528 277 A2 11/2012
WO WO 2012/130255 A1 10/2012

OTHER PUBLICATIONS

Laner et al., "A Comparison Between One-Way Delays in Operating HSPA and LTE Networks", Modeling and Optimization in Mobile, Ad Hoc and Wireless Networks (WiOpt), 2012 10$^{th}$ International Symposium on, IEEE, May 14, 2012, pp. 286-292.
(Continued)

*Primary Examiner* — Chirag G Shah
*Assistant Examiner* — Srinivasa R Reddivalam
(74) *Attorney, Agent, or Firm* — Harrity & Harrity, LLP

(57) ABSTRACT

Network packet traffic in a Long Term Evolution (LTE) network is analyzed by associating a micro network access agent with a single network element in the LTE network and performing packet traffic analysis for packet traffic processed by the single network element using the micro network access agent.

20 Claims, 4 Drawing Sheets

Related U.S. Application Data continuation of application No. 14/151,371, filed on Jan. 9, 2014, now Pat. No. 9,565,073.

(60) Provisional application No. 61/750,620, filed on Jan. 9, 2013.

(52) U.S. Cl.
CPC ...... *H04L 43/0829* (2013.01); *H04L 43/0852* (2013.01); *H04L 43/0882* (2013.01); *H04L 43/0888* (2013.01)

(56) References Cited

U.S. PATENT DOCUMENTS

| | | | |
|---|---|---|---|
| 2008/0247331 A1 | 10/2008 | Becker | |
| 2010/0061261 A1* | 3/2010 | Bugenhagen | H04L 43/00 370/252 |
| 2011/0319129 A1 | 12/2011 | Bhat | |
| 2012/0129517 A1* | 5/2012 | Fox | H04L 41/5025 455/425 |
| 2012/0236713 A1 | 9/2012 | Kakadia | |
| 2012/0252458 A1* | 10/2012 | Ohnishi | H04L 43/062 455/436 |
| 2012/0300639 A1 | 11/2012 | Janakiraman et al. | |
| 2014/0086068 A1* | 3/2014 | Borsos | H04L 12/4633 370/248 |
| 2014/0092736 A1* | 4/2014 | Baillargeon | H04W 72/1226 370/230 |
| 2014/0204794 A1* | 7/2014 | El-Najjar | H04L 41/145 370/254 |
| 2015/0117204 A1* | 4/2015 | Lott | H04L 45/306 370/235 |

OTHER PUBLICATIONS

Notification of Transmittal of the International Search Report and the Written Opinion of the International Searching Authority, or the Declaration, PCT/US2014/010845, dated Mar. 28, 2014.

* cited by examiner

METHODS, SYSTEMS, AND COMPUTER PROGRAM PRODUCTS FOR DISTRIBUTED PACKET TRAFFIC PERFORMANCE ANALYSIS IN A COMMUNICATION NETWORK

CROSS REFERENCE TO RELATED APPLICATION

This application is a continuation of U.S. patent application Ser. No. 15/420,259, filed Jan. 31, 2017 (now U.S. Pat. No. 10,044,586), which is a continuation of U.S. patent application Ser. No. 14/151,371, filed Jan. 9, 2014 (now U.S. Pat. No. 9,565,073), which claims the benefit of U.S. Provisional Application No. 61/750,620, filed Jan. 9, 2013, the disclosures of which are hereby incorporated herein by reference.

FIELD OF THE INVENTION

The present invention relates to communication networks and methods of operating the same, and, more particularly, to methods, system, and computer program products for analyzing network behavior.

BACKGROUND OF THE INVENTION

With projected Long Term Evolution (LTE) traffic to exceed 4 Exabyte per month in 2014, current test and measurements solution vendors are faced with a great challenge to provide real time and scalable solution for LTE service and traffic analysis. Some current solutions involve the installation of very large and complex hardware probes at aggregate network nodes to be able to detect LTE service and traffic degradations and provide root cause analysis and traffic characterization. These hardware probes may fail to meet the increasing traffic volumes at these nodes and are exponentially costing more in terms of processing power needed. Such solutions are projected to cost more than the LTE network deployment cost.

One approach used by test and measurement providers relies on deploying a specialized hardware (Mega) probe at the main aggregate nodes in the LTE network. All the packets from all the different access nodes converge into these aggregate nodes and the Mega probe has to process the packets in real time to identify any degradation or protocol/technology/network errors that impact the LTE service. As the volume of the traffic and the number of access nodes expands, the processing power demand on the Mega probe increases exponentially because packets will typically come from different nodes at different interfaces all mingled together. Sorting and filtering may require processing each packet in real time and keeping it in memory until all packets related to the same session and service are examined and data correlated. Such requirements may strain the processing unit power and memory needs and can lead to an exponential cost increase as the traffic grows. This may result in an increase in the cost of the Mega probe as the network and traffic expand. It is projected that the cost of Mega probes may exceed the cost of the nodes they are monitoring.

Other approaches address the problem by sampling the packets as they arrive. In this case, based on random sampling techniques, only a fraction of the packets is examined. This approach can provide some insight into major chronic problems, but may not allow accurate detection and characterization of the LTE network and service performance and usage.

SUMMARY

It should be appreciated that this Summary is provided to introduce a selection of concepts in a simplified form, the concepts being further described below in the Detailed Description. This Summary is pot intended to identify key features or essential features of this disclosure, nor is it intended to limit the scope of the disclosure.

In accordance with some embodiments of the present inventive subject matter, network packet traffic in a Long Term Evolution (LTE) network is analyzed by associating a micro network access agent with a single network element in a Long Term Evolution (LTE) network and performing packet traffic analysis for packet traffic processed by the single network element using the micro network access agent.

In other embodiments, the method further comprises communicating the packet traffic analysis to a network management system for the LTE network.

In still other embodiments, the single network element comprises one of an eNode B element, Mobility Management Entity (MME) element, Home Subscriber Server (HSS) element, Serving Gateway (SGW) element, and Packet Data Network Gateway (PGW) element.

In still other embodiments, performing packet traffic analysis comprises analyzing a performance metric for the single network element.

In still other embodiments, the performance metric comprises one of traffic throughput, traffic capacity, packet loss, packet latency, packet jitter, base station handover efficiency, voice quality, and video quality.

In still other embodiments, associating the micro network access agent with the single network element comprises associating a plurality of micro network access agents with a plurality, of network elements, respectively, in the LTE network.

In still other embodiments, the method further comprises tagging a packet that is part of the packet traffic at a first one of the plurality of network elements using the micro network access agent that is associated therewith and analyzing the packet that was tagged at a second one of the plurality of network elements using the micro network access agent that is associated therewith.

In still other embodiments, the method further comprises communicating a packet analysis alert from a first one of the plurality of micro network access agents associated with a first one of the plurality of network elements to a network management system for the LTE network and receiving at a second one of the plurality of micro network access agents associated with a second one of the plurality of network elements a directive to analyze certain packets originated from the first one of the plurality of network elements, the directive being received from the network management system for the LTE network.

Although described primarily above with respect to method embodiments of the present inventive subject matter, it will be understood that the present invention may be embodied as methods, systems, and/or computer program products.

Other methods, systems, articles of manufacture, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EXEMPLARY EMBODIMENTS

Figure 1:
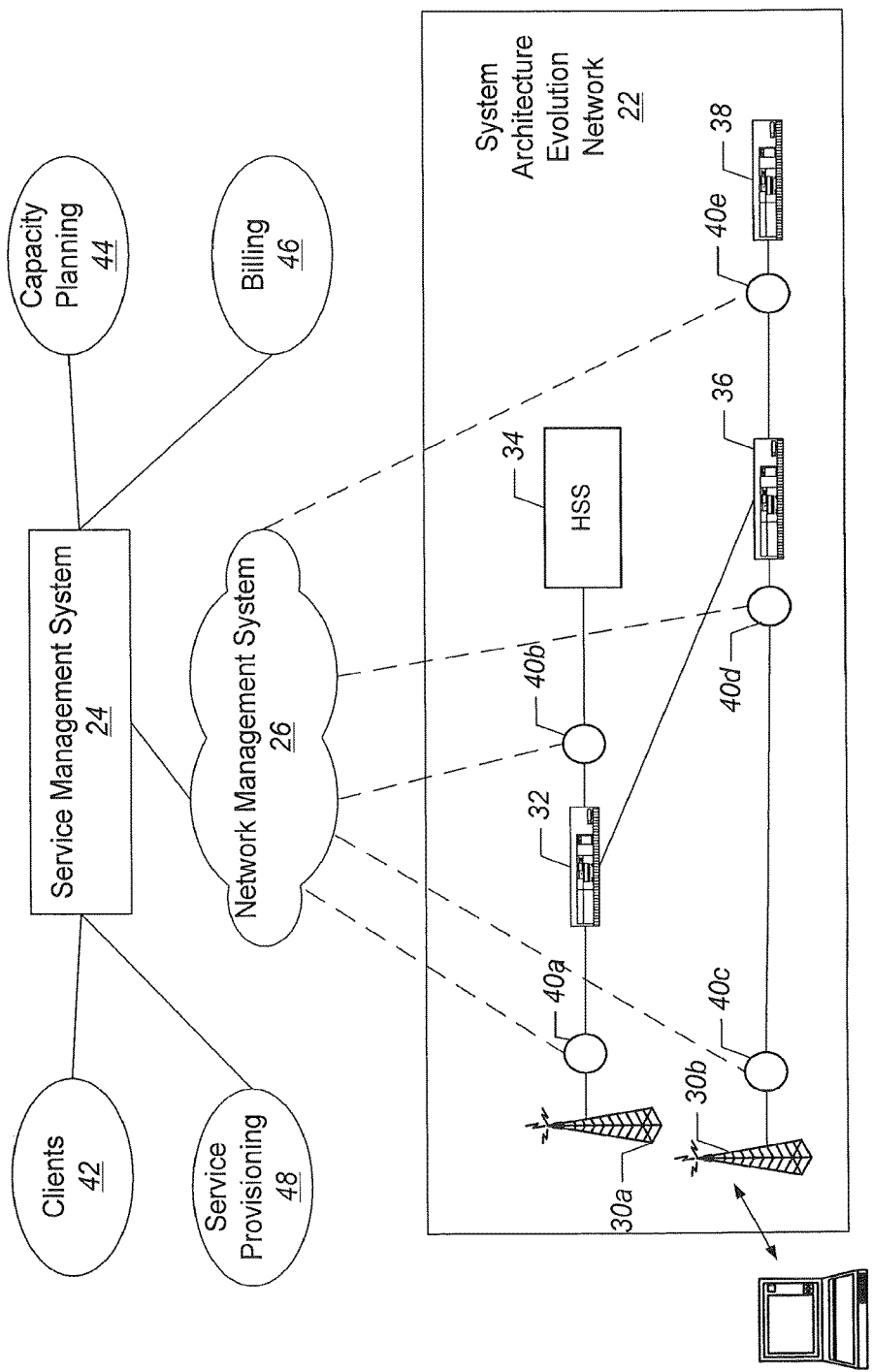
FIG. 1 illustrates a service/network management architecture that provides distributed packet traffic performance analysis for a communication network in accordance with some embodiments of the present inventive subject matter.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention may be embodied as systems, methods, and/or computer program products. Accordingly, the present invention may be embodied in hardware and/or in software (including firmware, resident software, microcode, etc.). Furthermore, the present invention may take the form of a computer program product that comprises a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Some embodiments of the present inventive subject matter may provide a thorough and accurate analysis of LTE network traffic and service performance in real time while accounting for the explosion in LTE traffic.

Some embodiments stem from a realization that distributing the packet analysis throughout the network using smaller processing units and agents, which may comprise hardware and/or software/hardware embodiments, called micro network access agents at various access points in the service delivery chain may provide probe units that are linearly cost effective and require a fraction of the processing used in conventional traffic monitoring, test, measurement, and analysis approaches.

A micro network access agent may be embodied as a software application running on the processor of a network element in the LTE network or as a small hardware unit with 1/10/100G Ethernet ports that tap into the current traffic ports and capture the packets in real time. The agent software resides in this case on the processing unit of the hardware and uses a generally small footprint both in processing power and memory.

Because the amount of packet traffic processed at a single network element is generally small compared to aggregate nodes traffic volume, the micro network access agent associated with these access nodes may perform full traffic and packet analysis and may allow prediction and tagging of packets that may eventually contribute to the accurate detection of potential issues with LTE service(s) before they actually propagate throughout the network. The micro network access agent may also have a real time communication mechanism using a network management system, which may facilitate sending signals to other micro network access agents associated with other network elements in the LTE (i.e., other aggregation points throughout the network) to alert these agents of the need to analyze specific packets (e.g., tagged packets) originated from a troubled access node and ignore other packets as they have been determined to be compliant and their analysis completed at the access side. This mechanism may reduce the need to have larger processing units at these aggregate nodes and scale linearly as the network expands. In the case of major or chronic issues, all the micro network access agents at the access nodes may initiate a major failure and a network management system may shut down the analysis at the micro network access agents at the various network elements (i.e., aggregate nodes) because it is not needed anymore.

An operator of an LTE network may interact through a service management system coupled to the network management system to access a "virtual" traffic measurement and analysis probe for the LTE network. The probe may be considered a "virtual" probe because the LTE operator is hidden from the underlying details of how the traffic measurement and analysis is performed. That is, the LTE operator is shielded from the details of whether multiple micro network access agents are used at strategic positions in the LTE network or if fewer mega probes are used that collect traffic measurements and perform analysis at high traffic aggregation points. A virtual probe embodied using multiple micro network access agents according to embodiments of the inventive subject matter may provide similar functionality and features as mega probes and the distributed analysis may be more accurate than that provided by mega probes that use traffic sampling. Moreover, the multiple micro network access agents may scale from a software perspective naturally as the traffic grows hence reducing the exponential cost explosion with the current hardware approach.

Referring now to FIG. 1, an exemplary service/network management system architecture, in accordance with some embodiments of the present invention, includes an LTE network 22, a service management system 24, and a network management system 26 that may be used to interface the service management system 24 to the LTE network 22. It will be understood that the LTE network 22 may be embodied in various ways in accordance with embodiments of the present inventive subject matter. As illustrated in FIG. 1, the LTE network 22 is embodied in accordance with the System Architecture Evolution Network architecture. The LTE network 22 includes eNode B elements 30a and 30b, a Mobility Management Entity (MME) element 32, a Home Subscriber Server (HSS) 34, a Serving Gateway (SGW) 36, and a PDN Gateway (PGW) 38 that are connected as shown.

The eNodeB elements 30a and 30b are base station transceivers for providing network access to User Equipment (UE). The MME element 32 may act as a control node for the LTE access network. Responsibilities for the MME element 32 include, but are not limited to, idle mode UE tracking and paging procedures including retransmissions, bearer activation/deactivation, and choosing the SGW 36 for a UE at the initial attach and at time of intra-LTE handover. The HS S element 34 is a central database that contains user-related and subscription-related information. The HSS element 34 may provide functionality related to mobility management, call and session establishment support, user authentication, and access authorization. The SGW element 36 may be configured to forward user data packets while also acting as a mobility anchor for the user plan during inter-eNodeB handovers and as the anchor for mobility between LTE and other 3GPP technologies. The PGW element 38 may provide connectivity from the UE to external packet data networks.

As shown in FIG. 1, micro network access agents 40a, 40b, 40c, 40d, and 40e are associated with the various network elements comprising the LTE network 22. These micro network access agents 40a, 40b, 40c, 40d, and 40e may be embodied as software applications that execute on the processors of the particular network elements that they are associated with, respectively, or may be embodied as separate hardware elements, which may include software running thereon. Each of these micro network access agents 40a, 40b, 40c, 40d, and 40e may be configured to analyze a portion or all of the packet traffic that is processed by the particular network element that it is associated with. According to some embodiments of the inventive subject matter, the analysis comprise analyze one or more performance metrics for the network element, one or more portions of the LTE network 22, and/or the entire LTE network 22. The performance metric(s) may comprise, but are not limited to, traffic throughput, traffic capacity, packet loss, packet latency, packet jitter, base station handover efficiency, voice quality, and video quality. The packet traffic analysis may be performed at the respective micro network access agents 40a, 40b, 40c, 40d, and 40e or, in some embodiments, all or portions of the packet traffic analysis may be performed in the network management system.

The service management system 24 and/or network management system 26 may communicate with the micro network access agents 40a, 40b, 40c, 40d, and 40e to collect, for example, performance, configuration, topology, timing, and/or traffic data therefrom. The data collected by the service management system 24 and/or network management system 26 are stored in repositories for use by other applications. The data may comprise raw measurement data of the traffic on the LTE network 22 and/or analyzed performance data including analyzed performance metric data generated by the micro network access agents 40a, 40b, 40c, 40d, and 40e. The repositories may, in some embodiments, be implemented as relational database management systems (RDBMS) that support the structured query language (SQL). It may be desirable to store the collected data in a SQL database to facilitate access of the collected data by other applications. Advantageously, applications may access a SQL database without having to know the proprietary interface of the underlying RDBMS.

Client applications 42 may communicate with the service management system 24 to access reports generated by the service management system 24 based on analyses of the collected data and to manage the services provided by the LTE network 22 (e.g., determine whether the services provided by the network 22 are in conformance with an agreed upon quality of service). Capacity planning applications 44 may communicate with the service management system 24 to assist an administrator in shaping/configuring the topology/shape of the LTE network 22 and/or to distribute traffic carried by the LTE network 22. Billing applications 46 may communicate with the service management system 24 to generate bills based on analyses of the data collected from the LTE network 22. Finally, service-provisioning applications 48 may communicate with the service management system 24 to facilitate the introduction of new services into the LTE network 22.

The service management system 24 and/or data processing system(s) supporting the client applications 42, the capacity planning applications 44, the billing applications 46, and the service provisioning applications 48 may be configured with computational, storage, and control program resources for managing service quality, in accordance with some embodiments of the present inventive subject matter. Thus, the service management system 24 and the data processing system(s) supporting the client applications 42, the capacity planning applications 44, the billing applications 46, and the service provisioning applications 48 may each be implemented as a single processor system, a multi-processor system, or even a network of stand-alone computer systems. In addition, the network management system 26 may be implemented as a single processor system, a multi-processor system, or even a network of stand-alone computer systems.

Although FIG. 1 illustrates an exemplary service/network management system architecture, it will be understood that the present inventive subject matter is not limited to such a configuration but is intended to encompass any configuration capable of carrying out the operations described herein.

Figure 2:
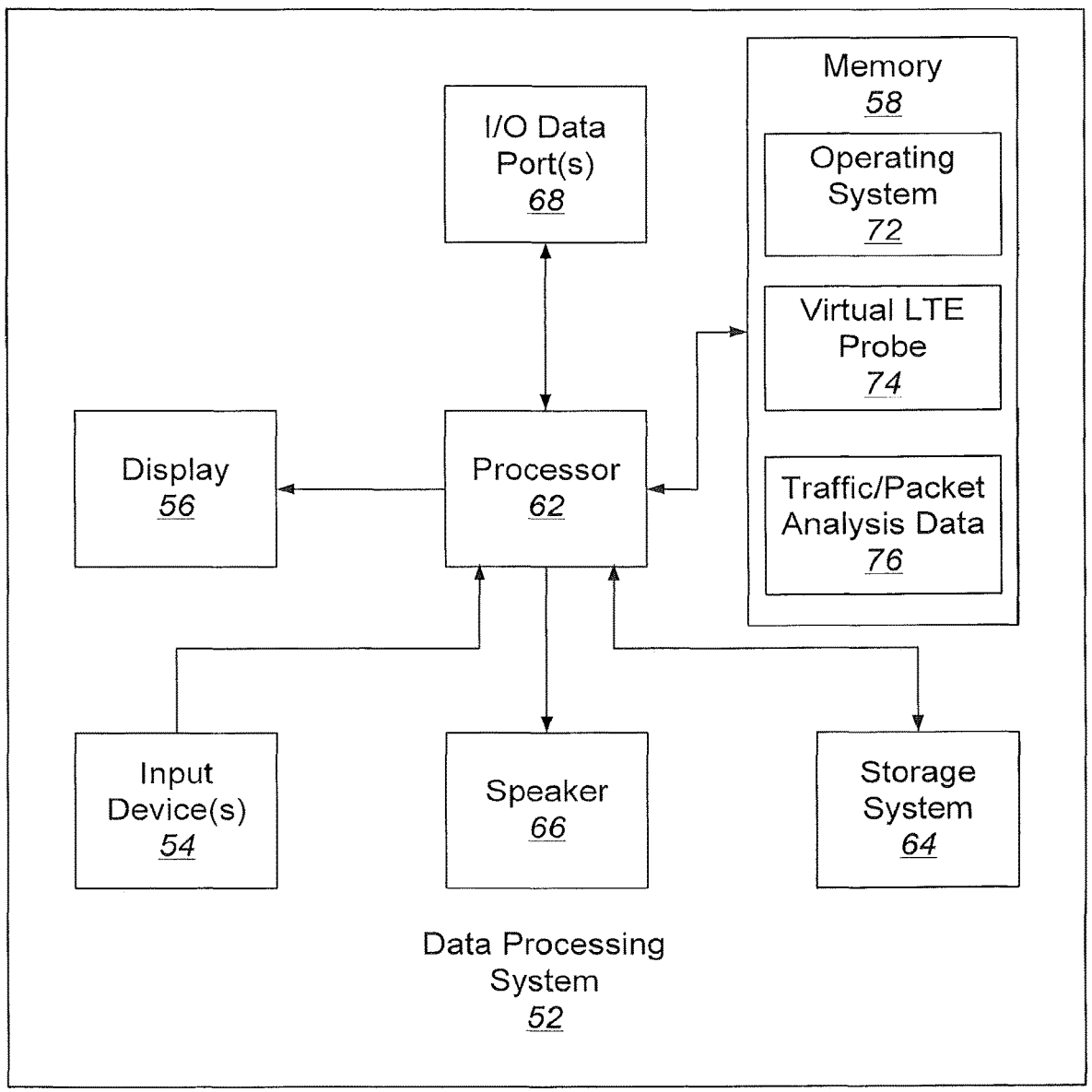
FIG. 2 is a block diagram of a data processing system that can be used to implement the network management system of FIG. 1 in accordance with some embodiments of the present inventive subject matter.

With reference to FIG. 2, the network management system 26 may be embodied as a data processing system 52. Embodiments of the data processing system 52 may include input device(s) 54, such as a keyboard or keypad, a display 56, and a memory 58 that communicate with a processor 62. The data processing system 52 may further include a storage system 64, a speaker 66, and an input/output (I/O) data port(s) 68 that also communicate with the processor 62. The storage system 64 may include removable and/or fixed media, such as floppy disks, ZIP drives, hard disks, or the like, as well as virtual storage, such as a RAMDISK. The I/O data port(s) 68 may be used to transfer information between the data processing system 52 and another computer system or a network (e.g., the Internet). These components may be conventional components such as those used in many conventional computing devices, which may be configured to operate as described herein.

The processor 62 communicates with the memory 58 via an address/data bus. The processor 62 may be, for example, a commercially available or custom microprocessor. The memory 58 is representative of the overall hierarchy of memory devices containing the software and data used to manage the network in accordance with some embodiments of the present invention. The memory 58 may include, but is not limited to, the following types of devices: cache, ROM, PROM, EPROM, EEPROM, flash, SRAM, and DRAM.

As shown in FIG. 2, the memory 58 may hold three or more major categories of software and data: an operating system 72, a virtual LTE probe module 74, and a traffic/packet analysis data module 76. The operating system 72 controls the operation of the network management system 26. In particular, the operating system 72 may manage the network management system's resources and may coordinate execution of programs by the processor 62. The operating system 72 may be configured to allow the software modules in the memory 58 to be implemented as an object-oriented system and may facilitate communication between the various software objects. The virtual LTE probe module 74 may be configured to facilitate access to a client application, such as an application used to facilitate access to the network management system 26 via an operator of the LTE network 22, to allow the application to access and review the packet traffic data and performance metric data generated by the micro network access agents 40a, 40b, 40c, 40d, and 40e and/or the network management system 26. The traffic packet/analysis data module 76 represents that packet traffic data and performance metric data generated by the micro network access agents 40a, 40b, 40c, 40d, and 40e and/or the network management system 26.

Computer program code for carrying out operations of the network management system 26 and/or the data processing system 52 discussed above with respect to FIGS. 1 and 2 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. In some embodiments, the computer program code may include commercially available applications and/or components provided by third parties. It will be further appreciated that the functionality of any or all of the program modules may also be implemented using discrete hardware components, one or more application specific integrated circuits (ASICs), or a programmed digital signal processor or microcontroller.

The present inventive subject matter is described herein with reference to flowchart and/or block diagram illustrations of methods, systems, and computer program products in accordance with exemplary embodiments of the inventive subject matter. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
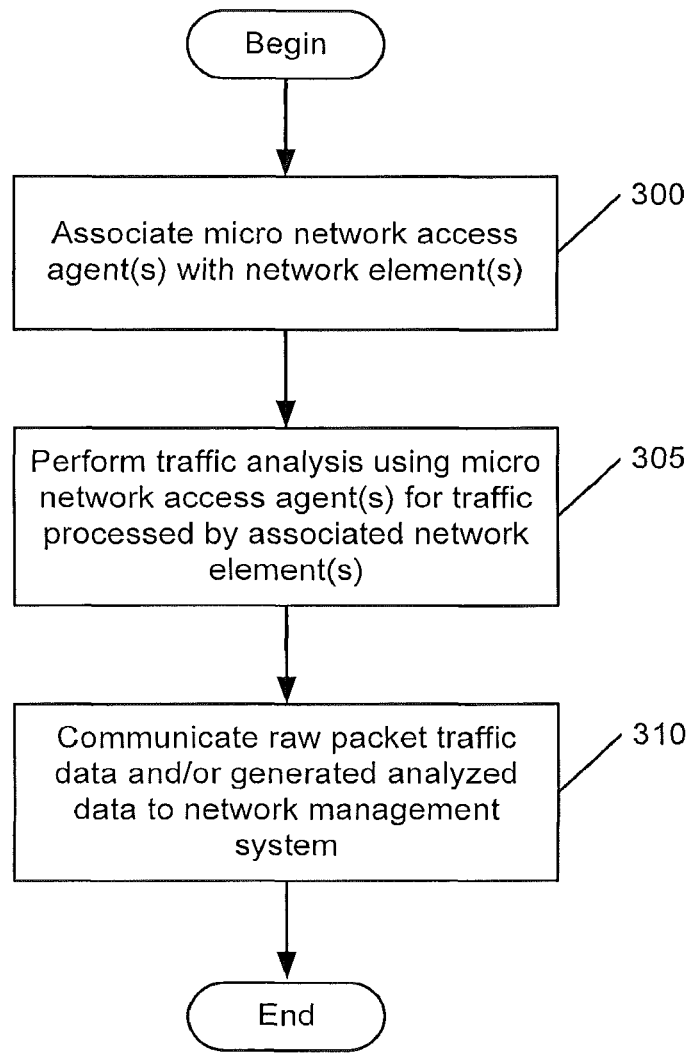
FIGS. 3 and 4 are flowcharts that illustrate operations for performing distributed packet traffic performance analysis for a communication network in accordance with some embodiments of the present inventive subject matter.

Referring now to FIG. 3, operations begin at block 300 where one or more micro network access agent 40a, 40b, 40c, 40d, 40e, is associated with one or more network elements in the LTE network 22. The one or more micro network access agents 40a, 40b, 40e, 40d, 40e perform packet traffic analysis for packet traffic processed by the associated network element(s) at block 305. In some embodiments, the raw packet traffic data and/or the analysis of the packet traffic data collected/generated by the one or more network access agents 40a, 40b, 40c, 40d, 40e is communicated to the network management system 26 at block 310.

Figure 4:
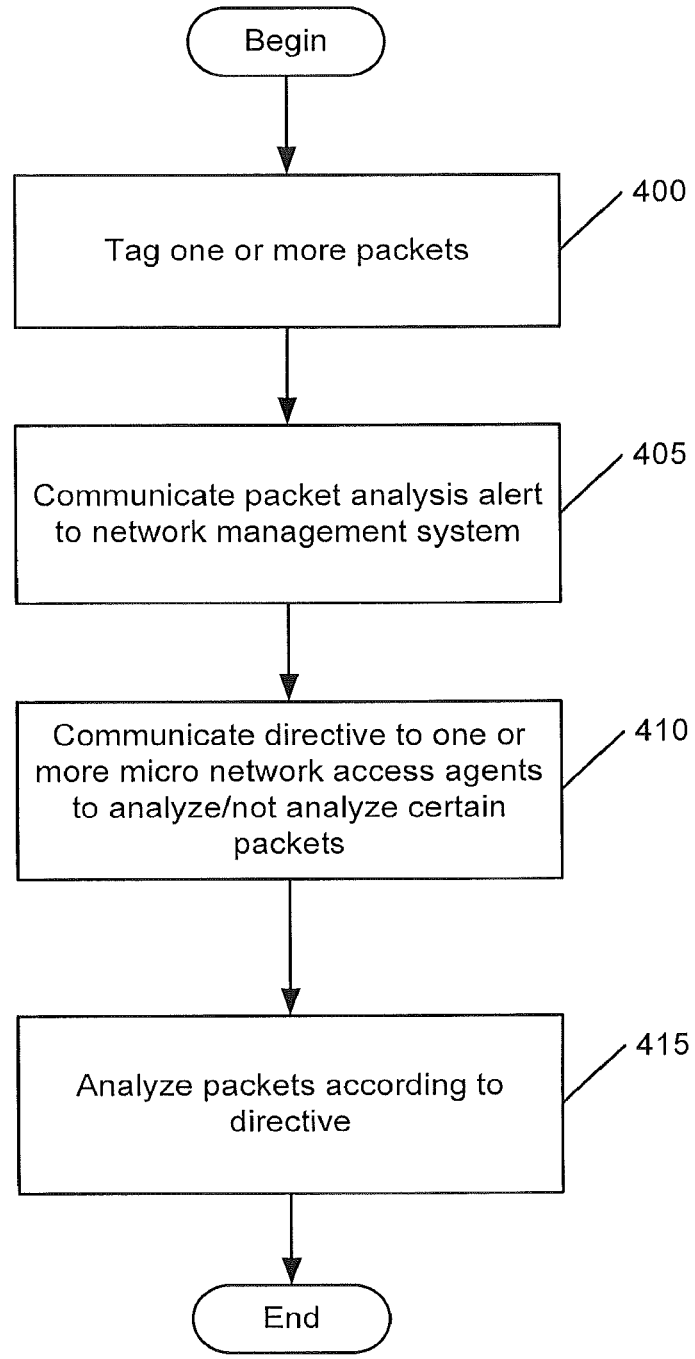

Referring now to FIG. 4, in some embodiments of the inventive subject matter, a micro network access agents 40a, 40b, 40c, 40d, 40e may tag or otherwise identify one or more packets that are part of the packet traffic processed by the network element that is associated with the particular micro network access agent 40a, 40b, 40c, 40d, 40e at block 400. The micro network access agent 40a, 40b, 40c, 40d, 40e that tagged the one or more packets may communicate with the network management system 26 at block 405 a packet analysis alert to trigger the network management system 26 to communicate with one or more other ones of the micro network access agents 40a, 40b, 40c, 40d, 40e with a directive at block 410 to perform a special analysis on certain packets, e.g., the tagged packet(s) and/or to ignore analyzing other packets, e.g., packet(s) that are not tagged.

Other ones of the micro network access agents 40a, 40b, 40c, 40d, 40e may then analyze the packet(s) that have been tagged according to any directive received from the network management system 26 at block 415.

The flowcharts of FIGS. 3 and 4 show the architecture, functionality, and operation of exemplary implementations of the software modules, hardware modules, and/or data used in some embodiments of the present inventive subject matter. In this regard, each block may represent a module, segment, or portion of code, which comprises one or more executable instructions for implementing the specified logical function(s). It should also be noted that in some alternative implementations, the functions noted in the blocks may occur out of the order noted in FIGS. 3 and 4. For example, two blocks shown in succession in FIGS. 3 and 4 may be executed substantially concurrently or the blocks may sometimes be executed in the reverse order, depending upon the functionality involved.

The embodiments described herein for providing distributed packet traffic performance analysis in a network may provide for the creation of a "virtual" network probe unit for performing LTE service and traffic analysis that is linearly cost effective and requires a fraction of the processing power needed for conventional network test and measurement approaches.

Many variations and modifications can be made to the embodiments described herein without substantially departing from the principles of the present invention. All such variations and modifications are intended to be included herein within the scope of the present invention, as set forth in the following claims.

The invention claimed is:

1. A method, comprising:
receiving, by a micro network access agent associated with a network element of a network, packet traffic;
identifying, by the micro network access agent, one or more specific packets based on packet traffic analysis information for the packet traffic,
the packet traffic analysis information including:
information associated with a base station handover efficiency, and
traffic capacity information associated with the network element and a determined quality of service; and
transmitting, by the micro network access agent and based on identifying the one or more specific packets, a signal to one or more other micro network access agents associated with the network,
the signal identifying the one or more specific packets for further analysis at the one or more other micro network access agents.

2. The method of claim 1, where the packet traffic analysis information further includes at least one of:
traffic capacity information associated with the network, voice quality information associated with the network, or video quality information associated with the network.

3. The method of claim 1, further comprising:
transmitting a packet analysis alert to a network management system for the network,
the network management system instructing, based on the packet analysis alert, one or more network elements to ignore performing an analysis of the one or more specific packets.

4. The method of claim 1, further comprising:
transmitting a packet analysis alert to a network management system for the network,
the network management system instructing, based on the packet analysis alert, one or more network elements to perform an analysis of the one or more specific packets.

5. The method of claim 1, where each micro network access agent, of the one or more other micro network access agents, is included in a single network element.

6. The method of claim 1, further comprising:
transmitting the packet traffic analysis information to a service management system associated with the network,
the service management system being to at least one of:
generate access reports, associated with the network, based on the packet traffic analysis information,
configure the network based on the packet traffic analysis information,
generate bills, associated with the network, based on the packet traffic analysis information, or
provision services in the network based on the packet traffic analysis information.

7. The method of claim 1, where the signal to the one or more other micro network access agents instructs the one or more other micro network access agents to ignore one or more packets other than the one or more specific packets.

8. A micro network access agent comprising:
a memory to store instructions; and
a processor to execute the instructions to:
receive packet traffic associated with a network element of a network;
identify one or more specific packets based on packet traffic analysis information for the packet traffic,
the packet traffic analysis information including information associated with a base station handover efficiency, and
traffic capacity information associated with the network element and a determined quality of service; and
transmit, based on identifying the one or more specific packets, a signal to one or more other micro network access agents associated with the network,
the signal identifying the one or more specific packets for further analysis at the one or more other micro network access agents.

9. The micro network access agent of claim 8, where the packet traffic analysis information further includes at least one of:
traffic capacity information associated with the network, voice quality information associated with the network, or video quality information associated with the network.

10. The micro network access agent of claim 8, where the processor is further to:
transmit a packet analysis alert to a network management system for the network,
the network management system instructing, based on the packet analysis alert, one or more network elements to ignore performing an analysis of the one or more specific packets.

11. The micro network access agent of claim 8, where the processor is further to:
transmit a packet analysis alert to a network management system for the network,
the network management system instructing, based on the packet analysis alert, one or more network elements to perform an analysis of the one or more specific packets.

12. The micro network access agent of claim 8, where each micro network access agent, of the one or more other micro network access agents, is included in a single network element.

13. The micro network access agent of claim 8, where the processor is further to:
transmit the packet traffic analysis information to a service management system associated with the network,
the service management system being to at least one of:
generate access reports, associated with the network, based on the packet traffic analysis information,
configure the network based on the packet traffic analysis information,
generate bills, associated with the network, based on the packet traffic analysis information, or
provision services in the network based on the packet traffic analysis information.

14. The micro network access agent of claim 8, where the signal to the one or more other micro network access agents instructs the one or more other micro network access agents to ignore one or more packets other than the one or more specific packets.

15. A non-transitory computer-readable medium storing instructions, the instructions comprising:
one or more instructions which, when executed by a processor of a first network element, cause the processor to:
receive packet traffic associated with a network element of a network;
identify one or more specific packets based on packet traffic analysis information for the packet traffic,
the packet traffic analysis information including information associated with a base station handover efficiency of the network, and
traffic capacity information associated with the network element and a determined quality of service; and
transmit, based on identifying the one or more specific packets, a signal to one or more other micro network access agents associated with the network,
the signal identifying the one or more specific packets for further analysis at the one or more other micro network access agents.

16. The non-transitory computer-readable medium of claim 15, where the instructions further comprise:
one or more instructions which, when executed by the processor, cause the processor to:
transmit a packet analysis alert to a network management system for the network,
the network management system instructing, based on the packet analysis alert, one or more network elements to ignore performing an analysis of the one or more specific packets.

17. The non-transitory computer-readable medium of claim 15, where the instructions further comprise:
one or more instructions which, when executed by the processor, cause the processor to:
transmit a packet analysis alert to a network management system for the network,
the network management system instructing, based on the packet analysis alert, one or more network elements to perform an analysis of the one or more specific packets.

18. The non-transitory computer-readable medium of claim 15, where each micro network access agent, of the one or more other micro network access agents, is included in a single network element.

19. The non-transitory computer-readable medium of claim 15, where the instructions further comprise:
one or more instructions which, when executed by the processor, cause the processor to:
transmit the packet traffic analysis information to a service management system associated with the network,
the service management system being to at least one of:
generate access reports, associated with the network, based on the packet traffic analysis information,
configure the network based on the packet traffic analysis information,
generate bills, associated with the network, based on the packet traffic analysis information, or
provision services in the network based on the packet traffic analysis information.

20. The non-transitory computer-readable medium of claim 15, where the signal to the one or more other micro network access agents instructs the one or more other micro network access agents to ignore one or more packets other than the one or more specific packets.

* * * * *